United States Patent
Cremonini

(10) Patent No.: US 6,334,811 B1
(45) Date of Patent: Jan. 1, 2002

(54) LINE FOR STRIPPING MEAT FROM CATTLE FORE AND HIND QUARTERS

(75) Inventor: Luigi Cremonini, Castelvetro (IT)

(73) Assignee: Inalca-Industria Alimentare-Carni-Societa' per Azioni, Castelvetro (IT)

( * ) Notice: Subject to any disclaimer, the term of this patent is extended or adjusted under 35 U.S.C. 154(b) by 0 days.

(21) Appl. No.: 09/450,662

(22) Filed: Nov. 30, 1999

(30) Foreign Application Priority Data

Dec. 10, 1999 (IT) ........................................ RE98A0126

(51) Int. Cl.$^7$ .............................................. A22C 18/00
(52) U.S. Cl. ........................................ 452/149; 452/187
(58) Field of Search ................................. 452/149, 125, 452/127, 132, 166, 187

(56) References Cited

U.S. PATENT DOCUMENTS

| | | | | |
|---|---|---|---|---|
| 3,533,131 A | * | 10/1970 | Ivarsson | ...................... 452/160 |
| 4,015,538 A | | 4/1977 | Webb et al. | |
| 4,090,275 A | * | 5/1978 | Jorgensen et al. | ........... 452/182 |
| 4,651,384 A | | 3/1987 | Korhonen | |
| 4,653,149 A | * | 3/1987 | Swilley | ........................ 452/129 |
| 4,797,975 A | * | 1/1989 | Soullard et al. | ............. 452/149 |
| 5,003,665 A | * | 4/1991 | Moritz | ........................ 452/149 |

FOREIGN PATENT DOCUMENTS

| | | |
|---|---|---|
| DE | 3321564 A1 | 12/1984 |
| EP | 0121477 A1 | 10/1984 |
| EP | 0300940 A1 | 1/1989 |
| EP | 0581711 A1 | 2/1994 |
| EP | 0586274 A1 | 3/1994 |
| EP | 0668018 A1 | 8/1995 |
| FR | 2689373 A1 | 10/1993 |

* cited by examiner

Primary Examiner—Willis Little

(57) ABSTRACT

A processing line for stripping fresh meat quarters which comprises an endless conveying line, an electrical power source operatively associated with said conveying line, a plurality of carriages slidably mounted on said processing line and communicating with said electrical power source for independent movement on said processing line, and, meat quarter support means operatively associated with each of said carriages for vertical adjustment relative to the conveying lines.

15 Claims, 5 Drawing Sheets

LINE FOR STRIPPING MEAT FROM CATTLE FORE AND HIND QUARTERS

BACKGROUND OF THE INVENTION

The present invention relates to cattle slaughtering lines, and in particular meat stripping lines.

In the known art slaughtered animals are cut into quarters, and specifically into two hind quarters and two fore quarters. The quarters are then stripped of meat and divided into the various meat pieces. Stripping is carried out by resting said quarters on a work bench on which specialized workers known as meat strippers operate to cut off the various meat pieces, known as cuts, and deposit them in appropriate collection baskets.

Each meat stripper is specialized in separating one or more specific cuts from the animal quarter, maximum productivity being achieved by making each meat stripper always separate the same cut.

In industrial slaughtering plants, from which high productivity is required, this procedure is of poor efficiency because the various meat strippers have to operate simultaneously on the same quarter, which slows down the entire meat processing operation.

Consequently in the slaughter industry there is a requirement to use a meat stripping line in which the flow of quarters and the work of the meat strippers are organized to a maximum extent.

SUMMARY OF THE INVENTION

An object of the present invention is to satisfy this requirement within the framework of a rational and reliable solution.

The object of the present invention is achieved according to the present invention by providing an animal meat stripping line which comprises an endless rail supporting a plurality of movable carriages, each provided with means enabling them to move along the rail, the meat quarters to be stripped being hooked onto them.

Each carriage is provided with a support mechanism for the meat quarter, means for positioning meat quarter at the required height to bring each cut to the most comfortable working height for the operator who is to separate it, means for supporting the quarters during the meat stripping operation, and means for collecting the separated meat cuts.

The processing line of the present invention is also provided with usual means for feeding the quarters to said carriages, means for emptying said collection means for the stripped meat pieces, and means for washing the collection means for the stripped meat pieces. There is also provided a line for withdrawing and evacuating the meat scraps resulting from the stripping.

Because of its characteristics, the line operation is very flexible.

The carriages are driven continuously along the line, each meat stripper following the carriage for the distance necessary to separate the meat cut of his responsibility.

The speed at which the carriages move is adjusted such as to give each operator sufficient time to separate his cut or cuts.

The maximum number of operators dedicated to the line corresponds to the number of cuts to be separated. However the line can also operate with a smaller number of operators if each operator is required to separate more than one cut.

In passing from one line portion to the next, the means which set the height of the quarter hanging from the carriage operate to bring to a convenient height that cut which is to be separated by the next operator.

BRIEF DESCRIPTION OF THE DRAWINGS

The operational and constructional characteristics of the invention will be more apparent from the ensuing description of a preferred embodiment thereof given by way of non-limiting example and illustrated on the accompanying drawings, wherein.

DETAILED DESCRIPTION OF THE INVENTION

The figures show the meat stripping line 1, which comprises a plurality of carriages 2, each of which is slidingly suspended from an endless overhead rail 3 of I cross-section.

Figure 3:
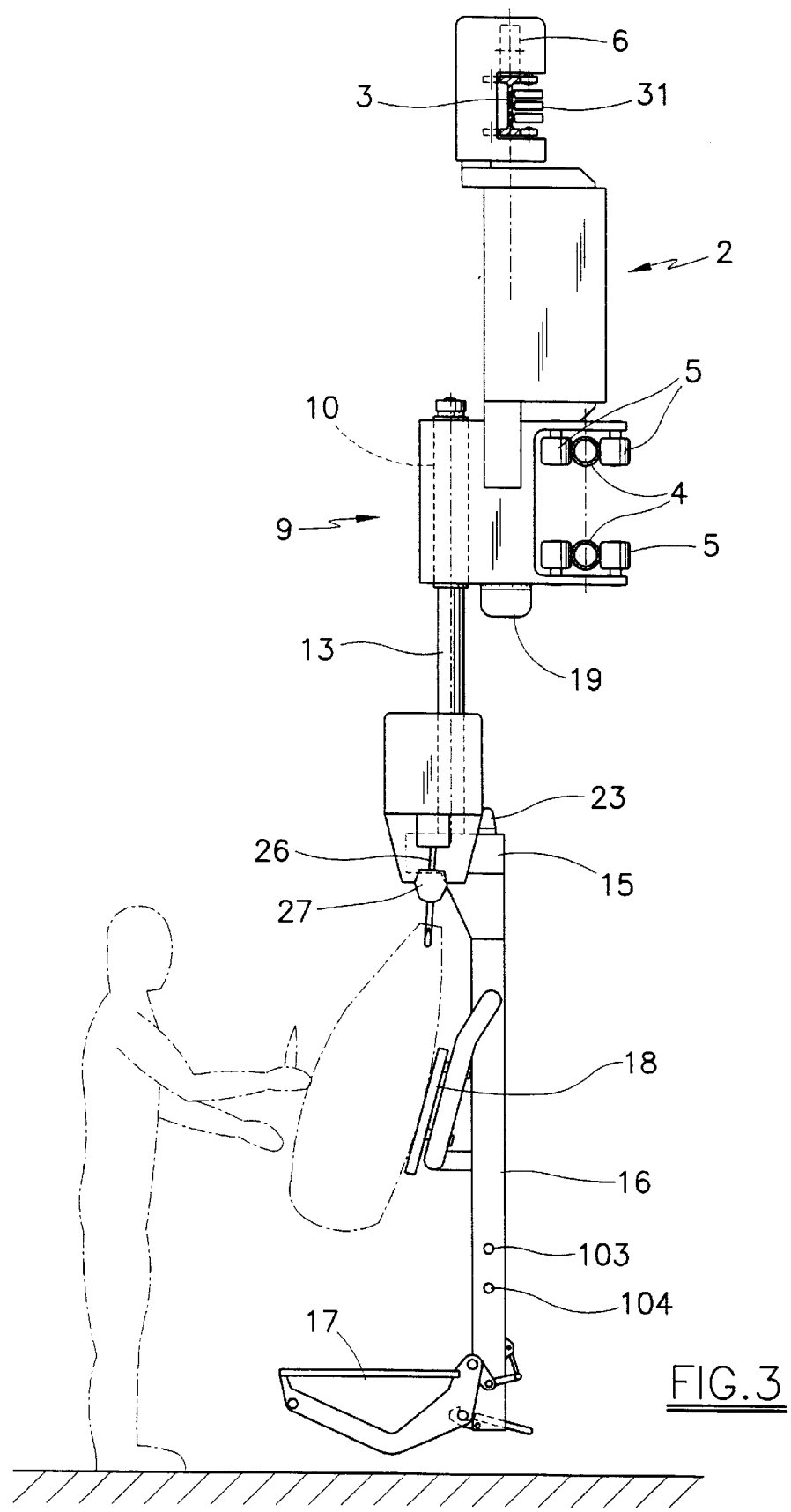
FIG. 3 is a view in the direction III of FIG. 2.
Figure 5:
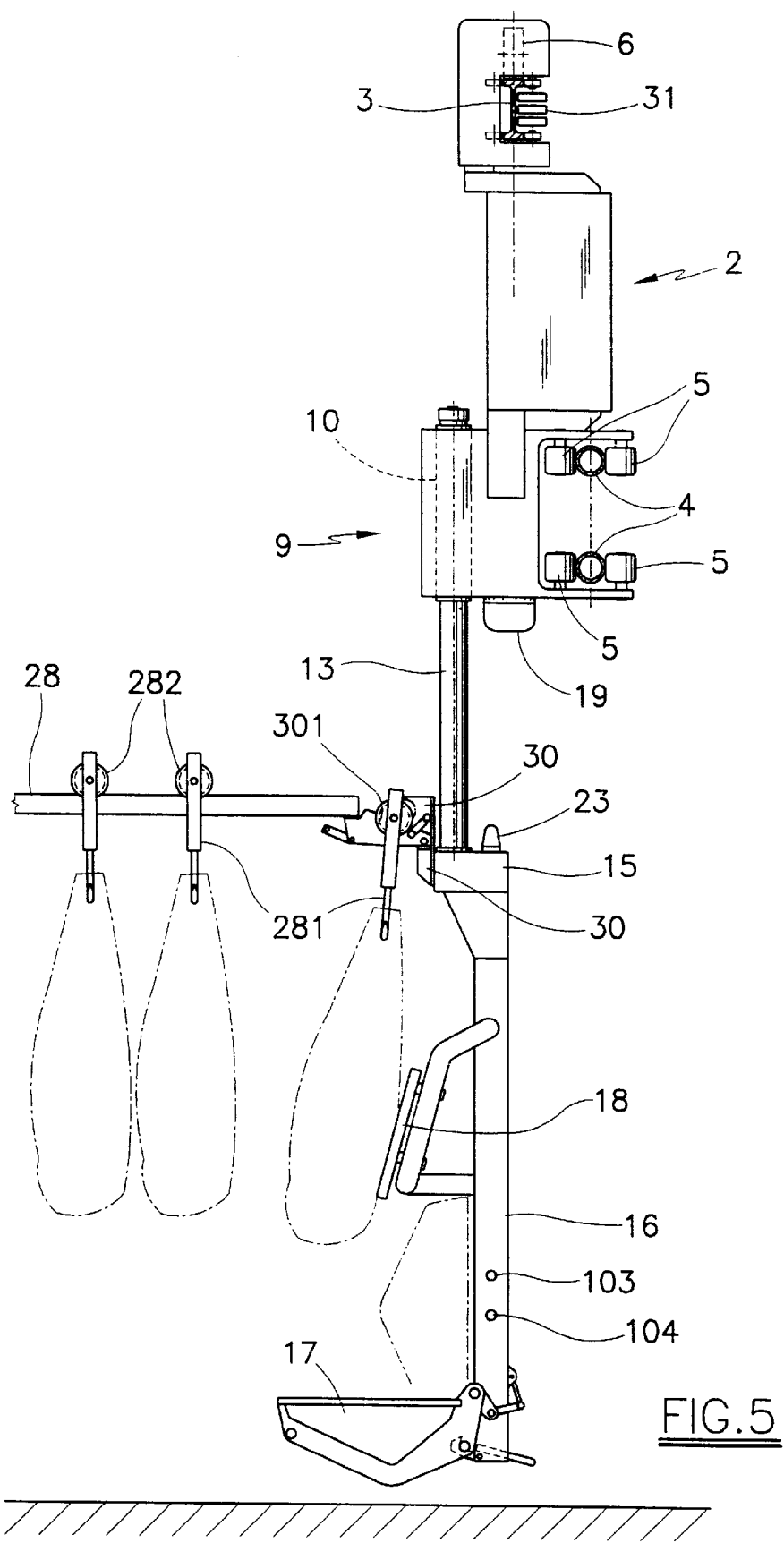
FIG. 5 is a view in the direction V of FIG. 4.

A bus duct 31, shown in FIGS. 3 and 5, is associated with the rail 3 to supply electricity to all the carriage devices mentioned hereinafter.

Specifically, each carriage 2 is suspended from the rail 3 by means of the wheels 6 and 7. The wheel 6, which is the front wheel in the direction of movement of the carriage 2, is motorized by a usual geared electric motor 8, which enables each carriage 2 to move along the rail 3.

With reference to FIGS. 2, 3, 4 and 5, the lower end of each carriage 2 is guided by wheels 5 slidable on identical guides 4, which are endless as in the case of the rail 3 and are parallel both to each other and to the rail 3.

At its front the carriage 2 presents a shaped body 9 comprising two slide sleeves 10 and 11 and two identical parallel rods 12 and 13. The upper end of the rods 12 and 13 are joined together upperly by a plate 14 and the lower ends thereof; by a plate 15 forming the terminal part of a vertically extending column 16 suspended from the carriage 2.

The column 16 lowerly supports a container 17 at its lower ends for collecting the stripped meat pieces, and also, at about its midpoint; supports an inclined work surface 18 constructed of a synthetic material such as teflon or the like.

The assembly consisting of the rods 12 and 13 and the column 16 functions as an elevator traveling along a vertical axis, the height of which can be adjusted by a geared electric motor 19, having an output shaft which is fixed to a gearwheel, for engaging the screw 20 positioned between and parallel to the rods 12 and 13 and fixed at its ends to the plates 14 and 15.

To prevent the thread of the screw 20 from becoming soiled or ruined, it is protected by a bellows sheath 21, and the bottom of the plate 14 is provided lowerly with a rubber stop plug 22. Likewise, the plate 15 is provided with the plug 23 for the same purpose.

Figure 1:
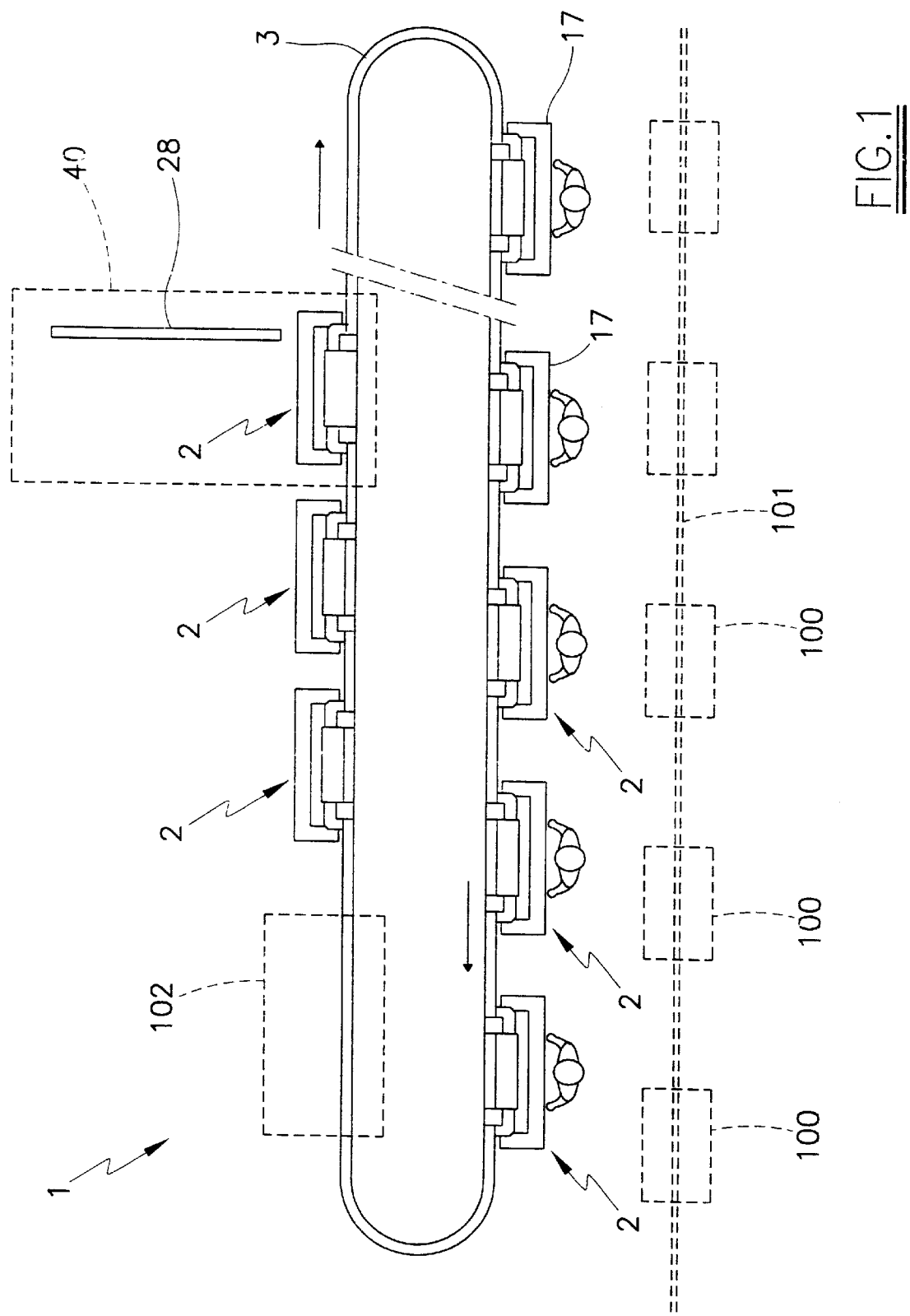
FIG. 1 is a schematic plan view of the meat stripping line of the present invention.
Figure 2:
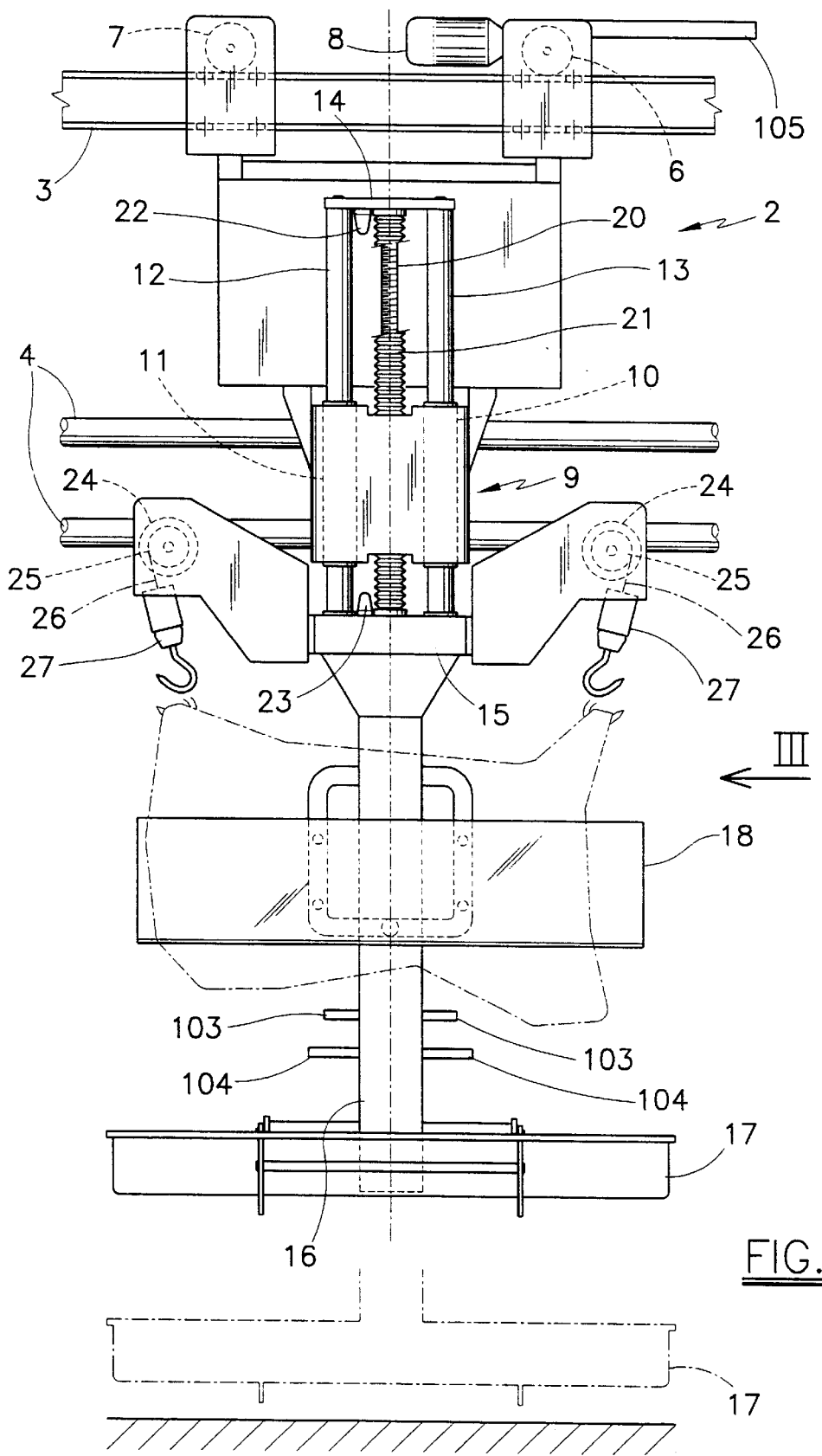
FIG. 2 is a front view of one of the constituent carriages of the line of the present invention, equipped for stripping the fore quarters.
Figure 4:
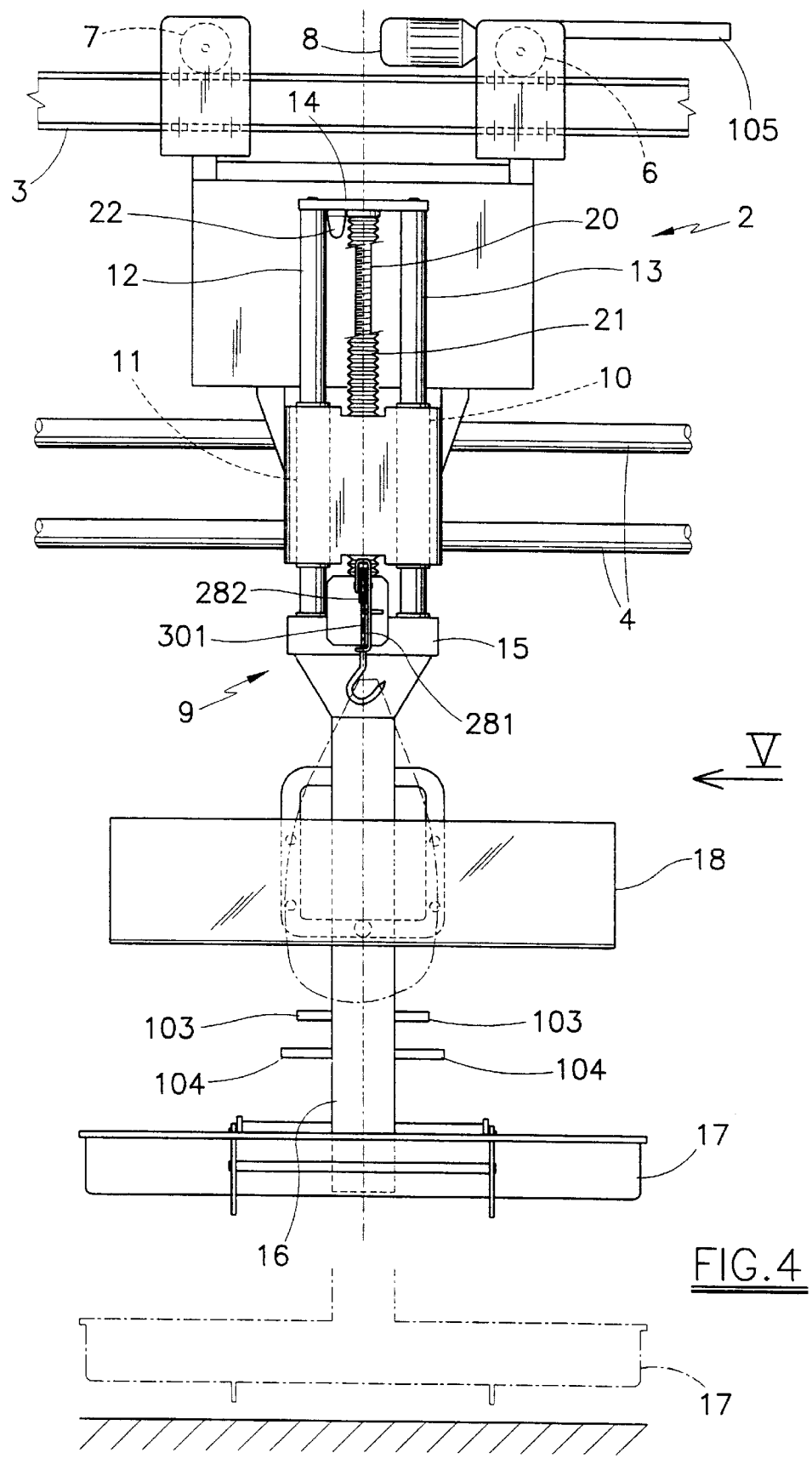
FIG. 4 is a front view of one of the constituent carriages of the line of the present invention, equipped for stripping the hind quarters.

The plate 15 also supports the structure which support the meat quarters to be stripped of meat. The structure varies depending on whether the line is dedicated to fore or hind quarters of meat. FIGS. 2 and 3 show a carriage 2 equipped for stripping fore quarters, whereas FIGS. 4 and 5 show the same carriage 2 equipped for stripping hind quarters.

With particular reference to FIGS. 2 and 3 the device for supporting meat fore quarters comprise two identical geared electric motors 24, on the shaft of which there is keyed a pulley 25 about which a chain 26 winds. To the free end of the chain 26 there is fixed a hook 27 to be inserted into a portion of the meat.

The meat fore quarters are hooked onto the hooks 27 by an operator who withdraws them, in the loading station 40, from a usual overhead conveying line, not shown.

To facilitate the operations which the operator has to carry out when hooking the meat quarters to the hooks 27, the hooks are lowered to a suitable height by the geared motors 24 to enable the operator to grip them and hook them to the meat quarter. The operator then causes the hooks 27 to rise so that the meat quarter is carried into the working position shown in the figures.

The device for supporting the meat hind quarters are shown in FIGS. 4 and 5. This device comprise a plate 30 fixed to the plate 15 by known means and shaped in such a manner as to automatically receive and support the meat quarters. Specifically, the meat quarters are fed to the carriage 2 when in the loading station 40, by an overhead conveying line comprising a guide 28 which supports sliding hooks 281 suspended from wheels 282, and from which the meat hind quarter is hung.

The end of the conveying line 28 is positioned in front of the plate 30 fixed to the base of the plate 15. Each plate 30 comprises a cradle 301 into which the wheel 282 is urged such that the quarter becomes supported by the carriage 2. The means which enable the wheels 282 to pass from the guide 28 to the cradle 301 are not shown as they are well known in overhead conveying systems.

The operation of the meat stripping line 1 is controlled by an electronic processor, not shown, which controls the movement of the carriages in accordance with the following operation, which varies according to which meat quarters are to be stripped.

If the line is dedicated to stripping meat fore quarters, an operator hooks the hooks 27 to each meat quarter which arrives suspended form the loading station 40, and then raises it until it rests on the rear lying surface 18.

If the line is dedicated to stripping hind quarters, the processor positions each carriage 2 in front of the line 28, and then slides the wheel 282 with its hook 281 and suspended quarter into the cradle 301 of the plate 30.

When the carriage has been loaded, it is driven with uniform speed along the rail 3.

As the carriage precedes along the rail it passes in front of the meat strippers, each of whom separates one or more meat cuts from the meat quarter. The meat cuts are then placed in the container 17, whereas the scraps are placed in appropriate collection baskets 100 positioned behind the operators to slide along an adjacent guide track 101.

On termination of stripping, a usual overturning device positioned along the line removes the container 17 and overturns the meat cuts onto a conveyor, not shown, then rehooks the container 17 to the carriage 2.

The carriage 2 is then passed to a wash station 102 and then parked (aligned with the other carriages) to await a new load.

The processor controls not only the travel speed of the individual carriages but also the height adjustment of the meat quarters, such that each line operator is presented at the most comfortable height with the meat cut to be separated.

In particular there is a continuous exchange of information and commands between each individual carriage and the processor along the entire extent of the line, so that on each carriage and in the various working positions there is a continuous variation in the height of the meat quarter and possible other parameters, to optimize the work of the respective operator in separating the meat cut.

The height of the quarter to be stripped can also be adjusted manually by two control switches 103 and 104, so that each operator can adjust the height of the quarter to his preferred position.

Finally, each carriage is provided with proximity sensors 105 to prevent them from colliding with the next carriage.

All the objects of the invention are attained by the aforedescribed combination of means.

What is claimed is:

1. A processing line for stripping fresh meat quarters which comprises
   an endless conveying line,
   an electrical power source operatively associated with said conveying line,
   a plurality of carriages slidably mounted on said processing line and communicating with said electrical power source for independent movement on said processing line, and,
   meat quarter support means operatively associated with each of said carriages, and means for vertically adjusting the meat quarter support means relative to the conveying lines.

2. The processing line as claimed in claim 1, further comprising at least one auxiliary guide rail with which each carriage is engaged to prevent it from swinging in a plane perpendicular to its advancement.

3. The processing line as claimed in claim 1, wherein meat quarter support mean includes a crosspiece provided with two rods slidable in two vertical seats in the carriage, and means for vertically adjusting the height of said crosspiece and said carriage.

4. The processing line as claimed in claim 3, wherein the means for vertically adjusting the height is a screw which is rigid with the crosspiece and is screwed into a bushing which is rigid with the carriage and rotated by an electric motor.

5. The processing line as claimed in claim 3, further comprising a vertical plate associated with said crosspiece, said vertical plate being provided with a cradle to receive a wheel carrying a suspended hook.

6. The processing line as claimed in claim 5, characterised in that said rail is arranged to lie in front of the carriages in alignment with the cradle provided in their crosspiece, thereby enabling the sliding hooks to pass from said rail to said cradle.

7. The processing line as claimed in claim 3, wherein the crosspiece is mounted on a column which supports a work surface for the meat quarter and a means for collecting the cuts of meat separated from the meat quarter.

8. The processing line as claimed in claim 7, wherein the means for collecting the meat cuts consist of a container removably fixed to the base of said column.

9. The processing line as claimed in claim 1, further comprising a loading station provided with a rail which feeds the meat quarters, suspended on sliding hooks, to the carriages.

10. The processing line as claimed in claim 9, wherein a carriage wash station is positioned upstream of the loading station.

11. The processing line of claim 1, wherein power means are operatively associated with said meat quarter support means for moving the support means to make said vertical adjustment.

12. The processing line of claim 11, wherein said meat quarter support means is further provided with power driven means for grouping the meat quarter and carrying it to a working position.

13. The processing line as claimed in claim 12, wherein the power driven means for grasping the meat comprises two independent winches operatively associated with said crosspiece, each of said winches being wound on a chain provided with an end hook.

14. The processing line of claim 11, wherein a work surface is operatively connected to said carriage.

15. The processing line of claim 11, wherein means are associated with said carriage for collecting cuts of meat separated from each meat quarter.

* * * * *

UNITED STATES PATENT AND TRADEMARK OFFICE
CERTIFICATE OF CORRECTION

PATENT NO. : 6,334,811 B1
DATED : January 1, 2002
INVENTOR(S) : Luigi Cremonini

It is certified that error appears in the above-identified patent and that said Letters Patent is hereby corrected as shown below:

<u>Title page,</u>
Item [30], Foreign Application Priority Data, please change the priority date from "Dec. 10, 1999" to -- Dec. 10, 1998 --.

Signed and Sealed this

Third Day of September, 2002

*Attest:*

*Attesting Officer*

JAMES E. ROGAN
*Director of the United States Patent and Trademark Office*